March 5, 1940.  C. TRCA  2,192,389
HEATER FOR STARTING COLD INTERNAL COMBUSTION ENGINES
Filed May 24, 1939  8 Sheets-Sheet 1

Inventor
Charles Trca
By Bryant & Lowry
Attorneys

March 5, 1940.　　　　C. TRCA　　　　2,192,389
HEATER FOR STARTING COLD INTERNAL COMBUSTION ENGINES
Filed May 24, 1939　　　8 Sheets-Sheet 2
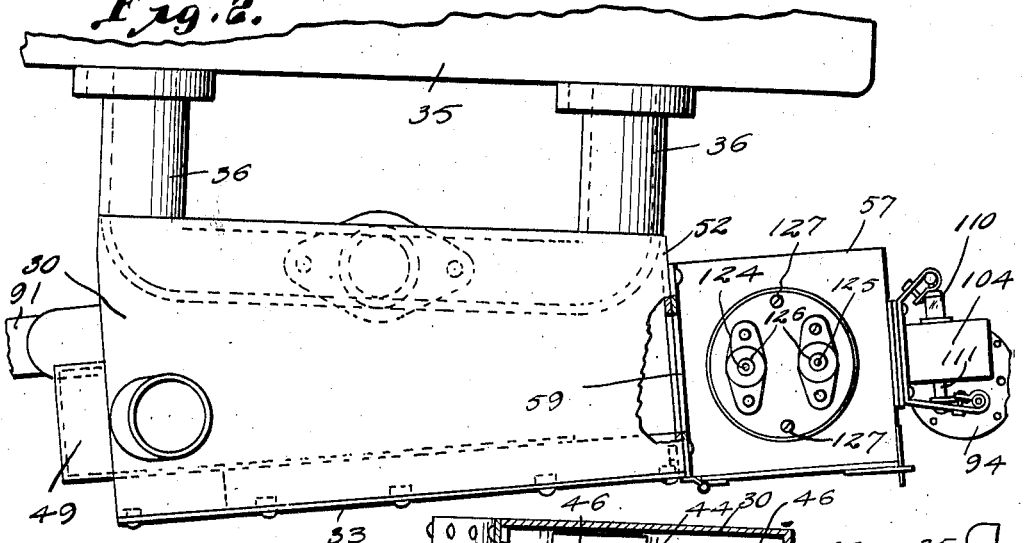
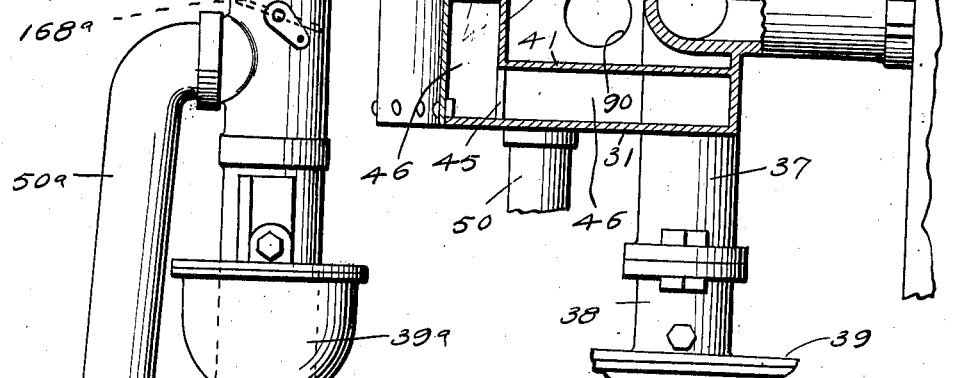
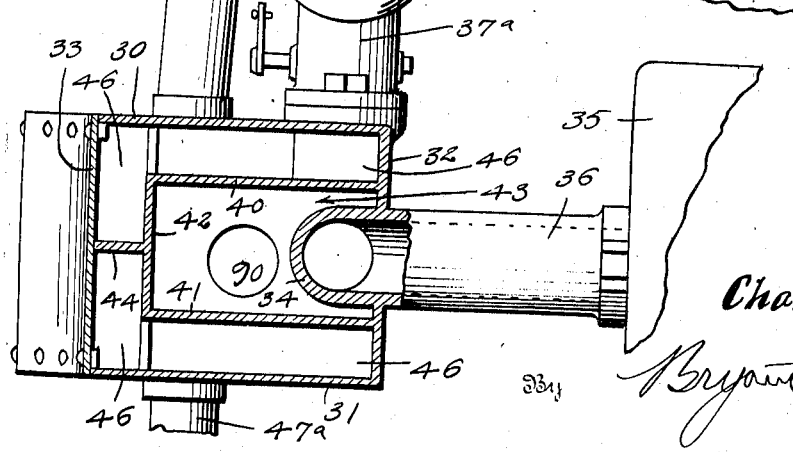
Inventor
Charles Trca
By Bryant & Lowry
Attorneys

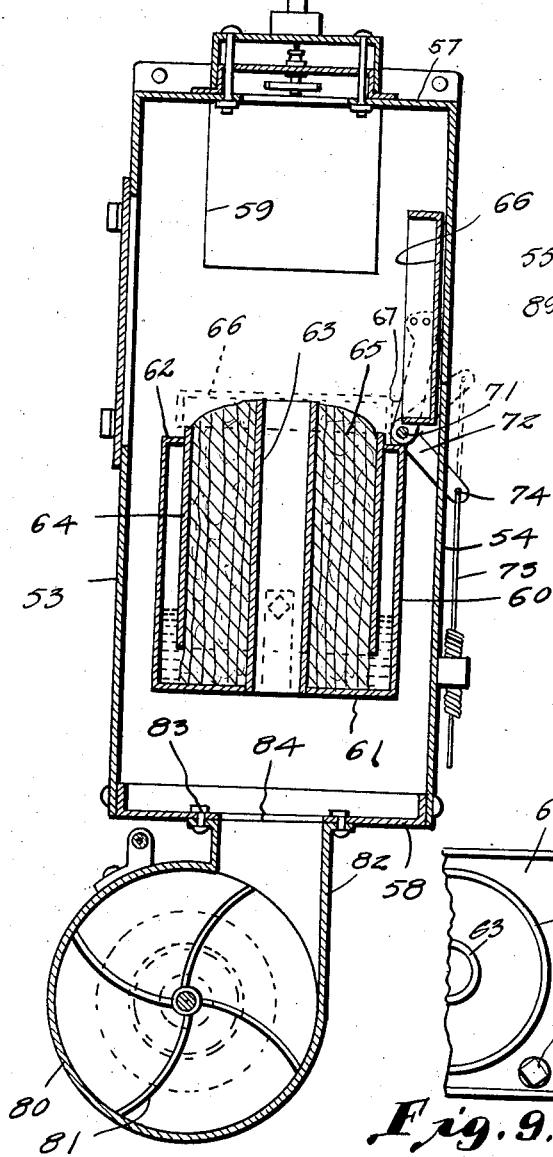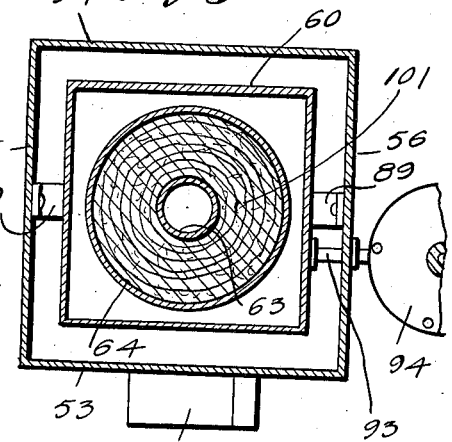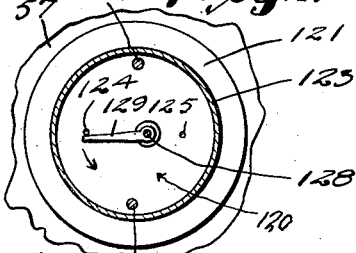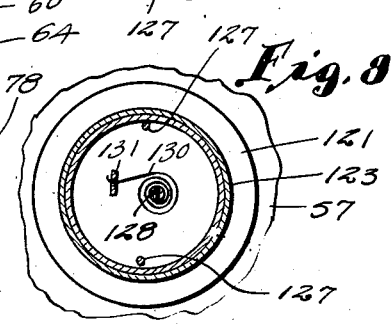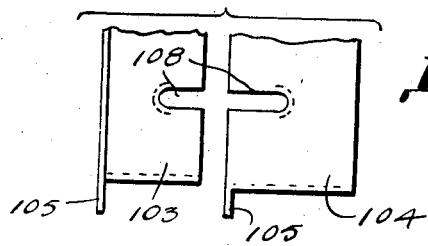

March 5, 1940. C. TRCA 2,192,389
HEATER FOR STARTING COLD INTERNAL COMBUSTION ENGINES
Filed May 24, 1939 8 Sheets-Sheet 4
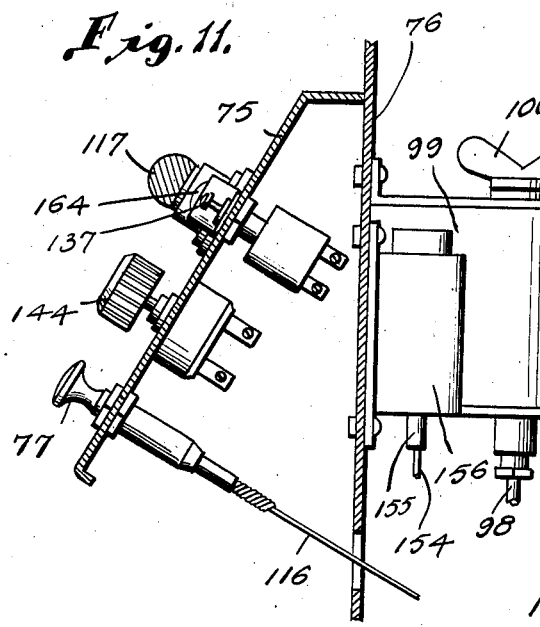
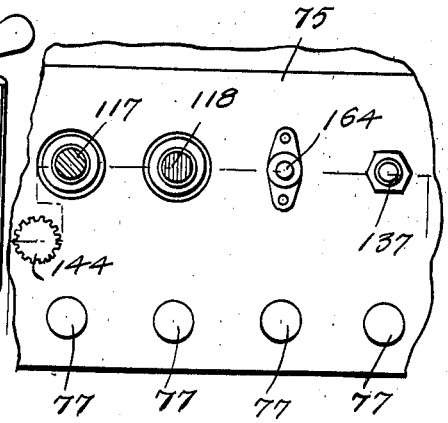
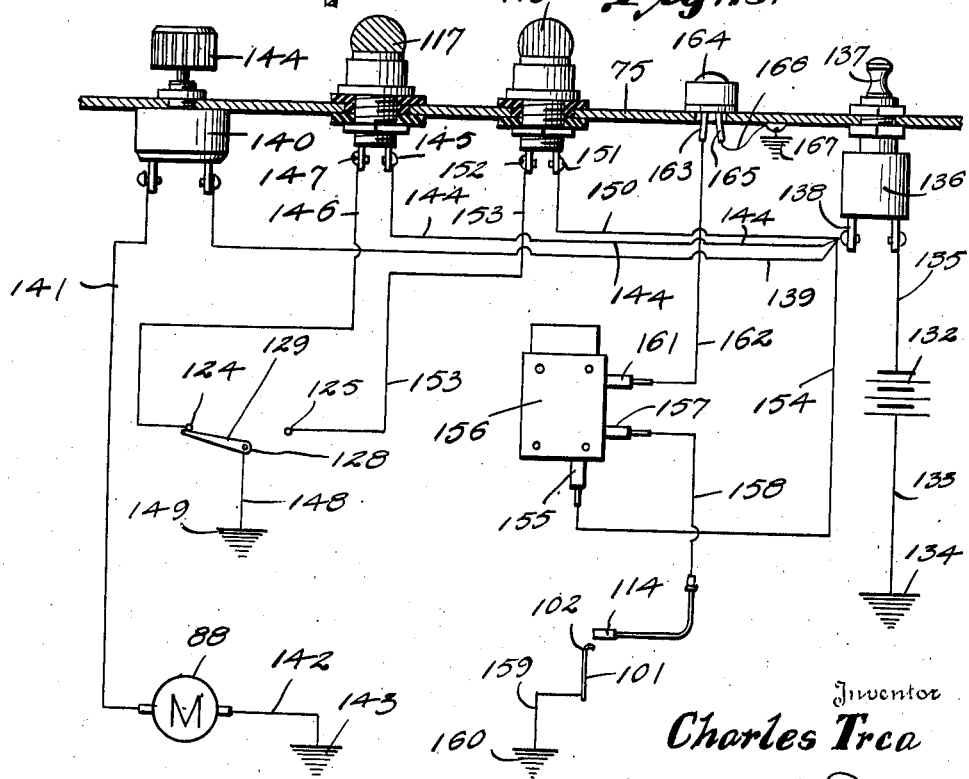
Inventor
Charles Trca
By Bryant & Lowry
Attorneys March 5, 1940.  C. TRCA  2,192,389
HEATER FOR STARTING COLD INTERNAL COMBUSTION ENGINES
Filed May 24, 1939  8 Sheets-Sheet 5
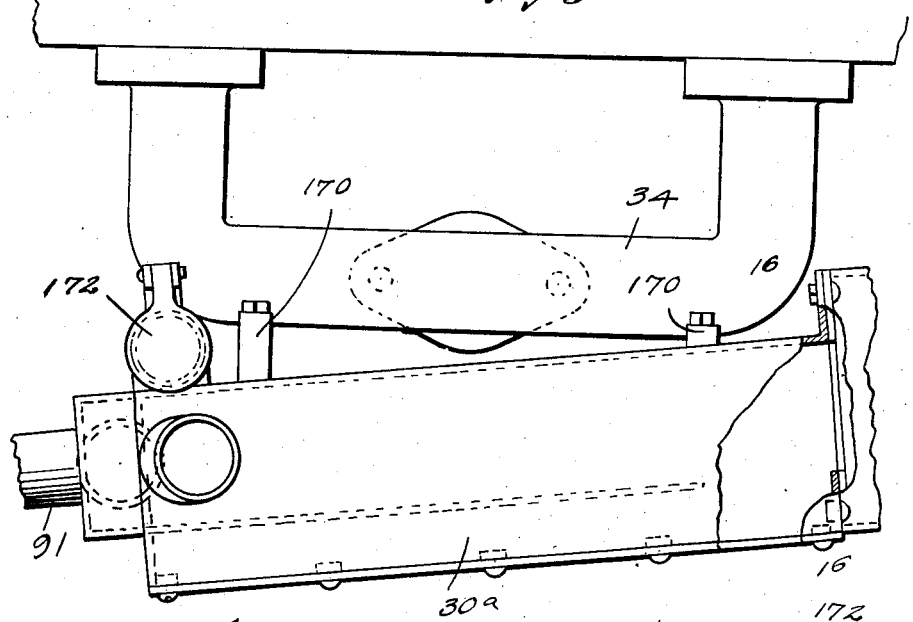
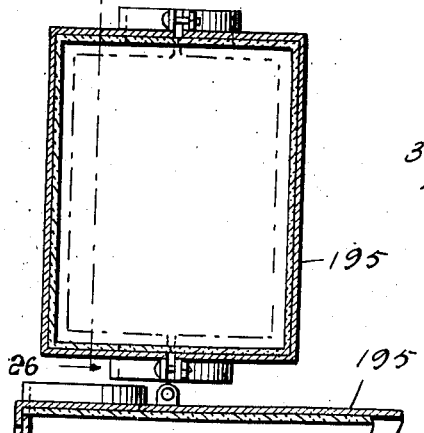
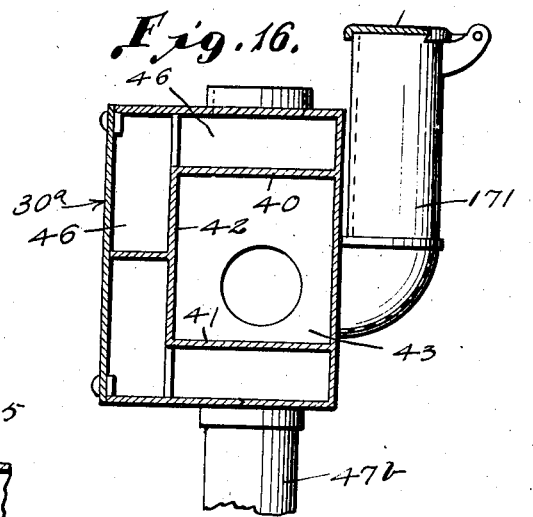
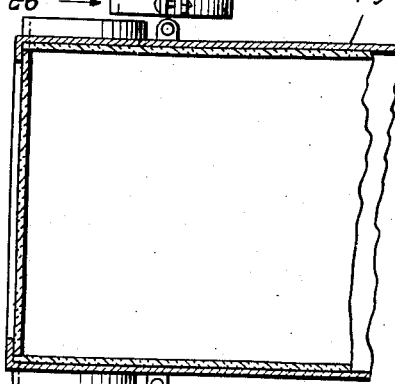
Inventor
Charles Trca
By Bryant & Lowry
Attorneys

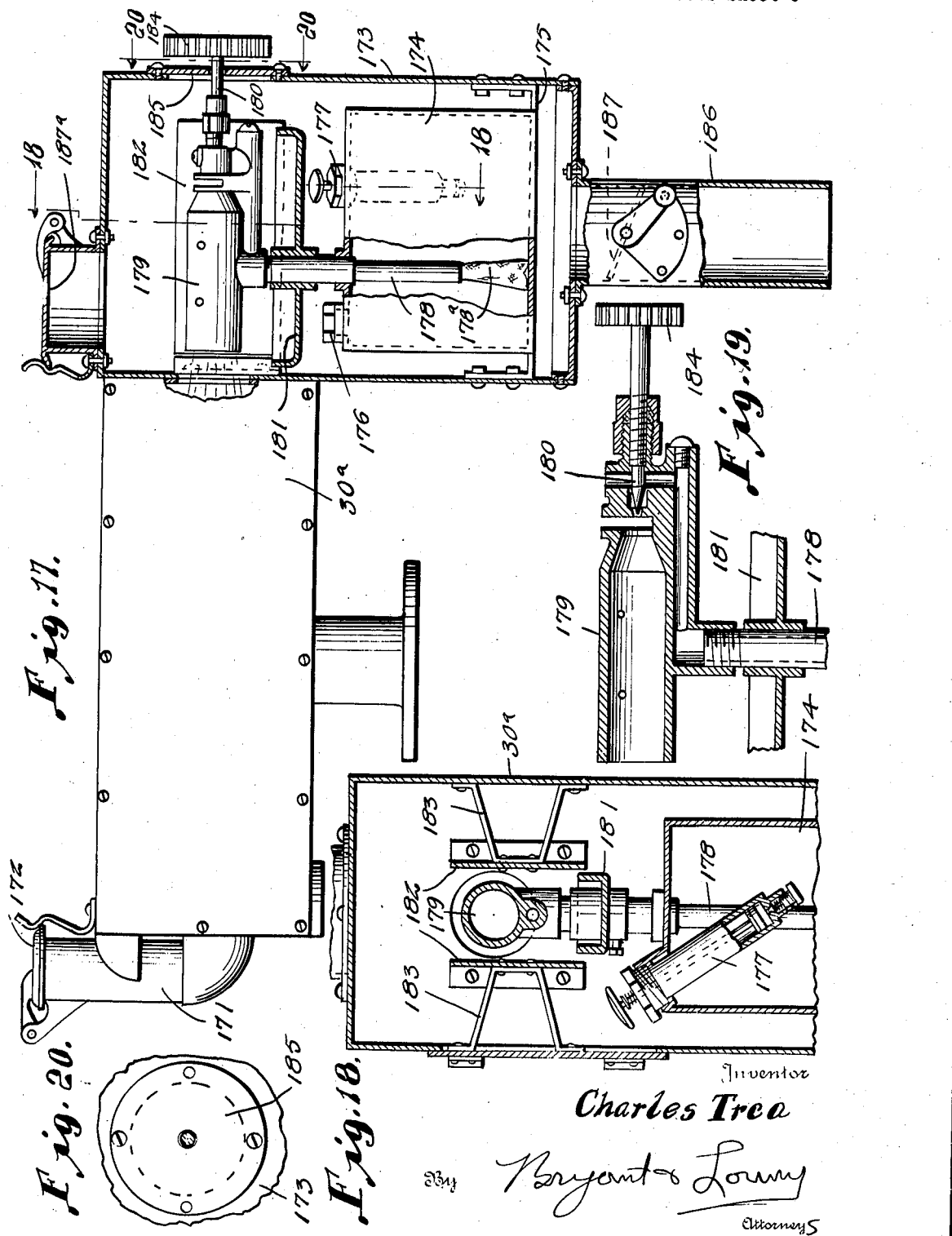

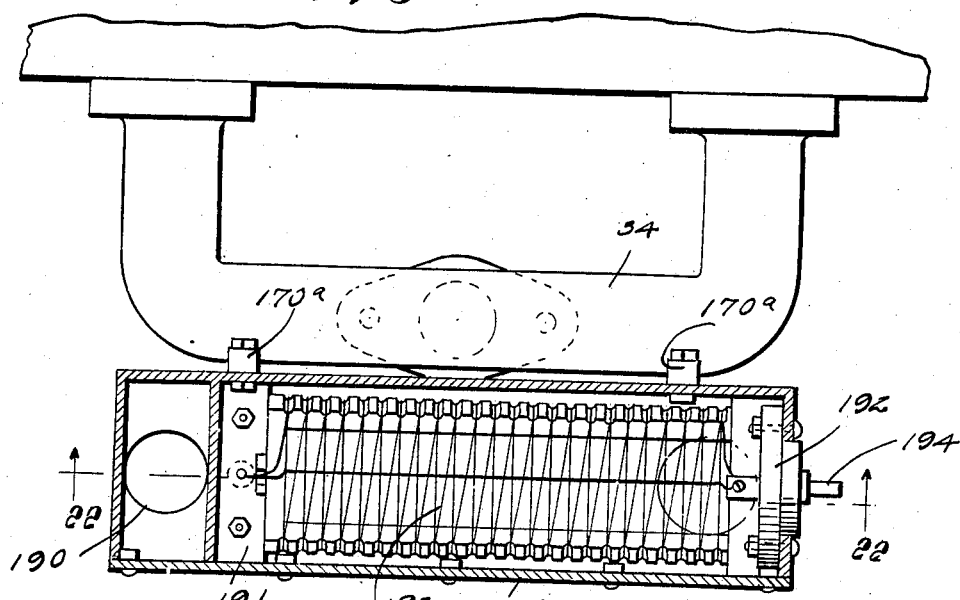
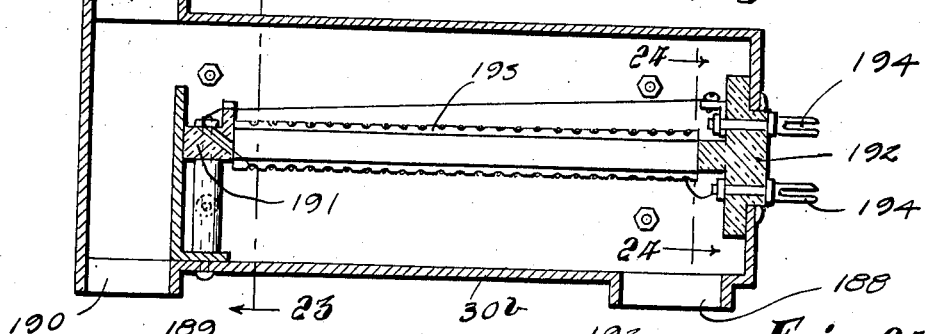
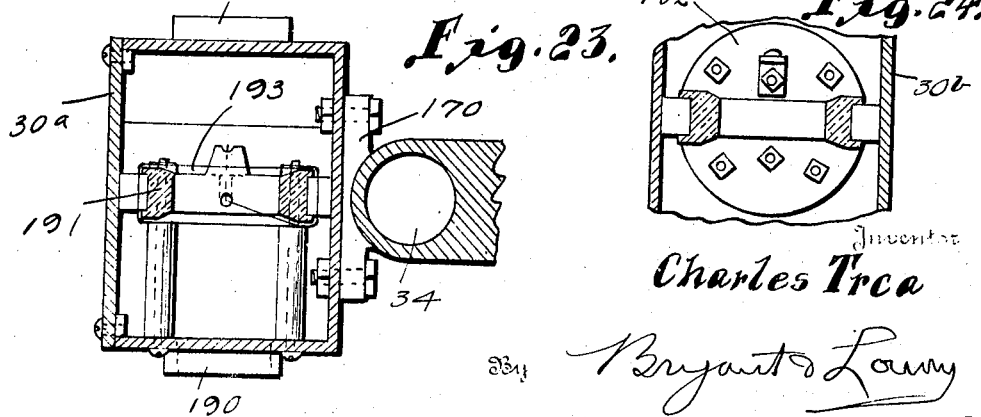

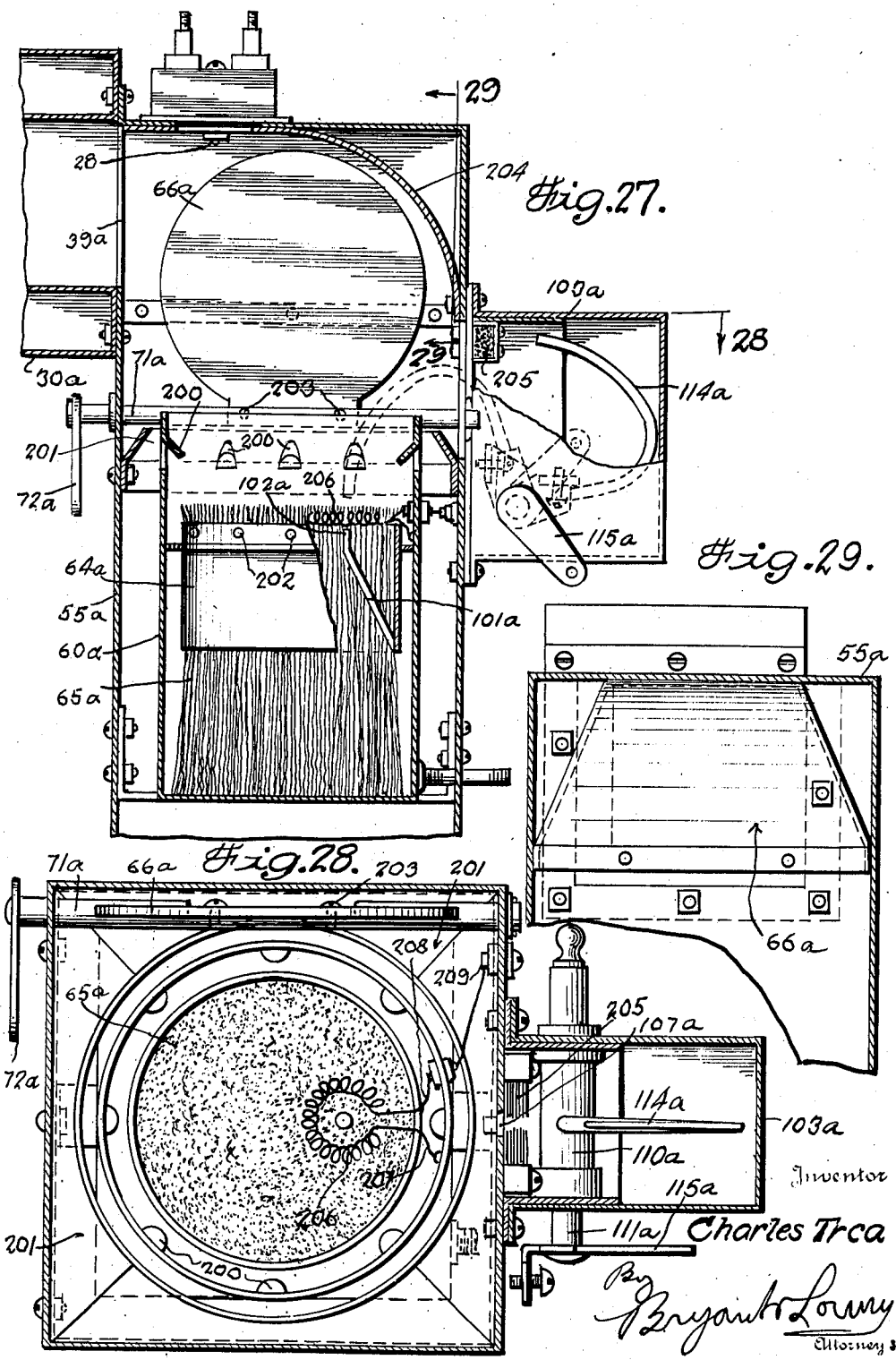

Patented Mar. 5, 1940

2,192,389

UNITED STATES PATENT OFFICE 2,192,389

HEATER FOR STARTING COLD INTERNAL COMBUSTION ENGINES

Charles Trca, Pontiac, Mich.

Application May 24, 1939, Serial No. 275,560

16 Claims. (Cl. 123—122)

This invention relates to certain new and useful improvements in heaters for starting cold internal combustion engines, and is of the general type of invention disclosed in the patent granted to Charles Trca, on February 2, 1937, Patent No. 2,069,689.

The primary object of the invention is to provide a heater for starting cold internal combustion engines wherein an air heater casing may be unitarily constructed with the intake manifold of an internal combustion engine or designed for attachment thereto with air heating means associated with the air heater casing and operable from the instrument board of the motor vehicle for the heating of air that flows in a circuitous passage through the heater casing with the flame or products of combustion of the heating device flowing through a chamber in the heater casing in which a part of the intake manifold of the internal combustion engine is located.

A further object of the invention is to provide a heater for starting cold internal combustion engines wherein the heater embodies a casing constructed for the flow of air therethrough with means for connecting the casing to a carbureter and wherein the heater casing encloses an electrical resistance element over which the air flows for heating thereof.

With the above and other objects in view that will become apparent as the nature of the invention is better understood, the same consists in the novel form, combination and arrangement of parts hereinafter more fully described, shown in the accompanying drawings and claimed.

In the drawings—

Figure 2 is a fragmentary top plan view, partly broken away and shown in section, and illustrating the heater associated with the intake manifold of an internal combustion engine with the engine block fragmentarily shown;

Figure 3 is a fragmentary vertical cross-sectional view taken on line 3—3 of Figure 2, showing the heater chamber and air passages in the heater casing;

Figure 4 is a vertical cross-sectional view taken on line 4—4 of Figure 1, showing the burner casing, housing and alcohol burner with the flame snuffer of the burner illustrated by dotted lines in its flame snuffing position;

Figure 5 is a horizontal sectional view taken on line 5—5 of Figure 1;

Figure 7 is a detail sectional view taken on line 7—7 of Figure 1, showing the heat responsive switch arm and contact for the operation of signal devices to determine the temperature of the heated air;

Figure 8 is a detail sectional view taken on line 8—8 of Figure 1, showing the heat responsive coil spring for the operation of the switch arm of the air temperature signal;

Figure 9 is a fragmentary top plan view of the alcohol burner with a cleaner rod for the burner wick;

Figures 1, 6:
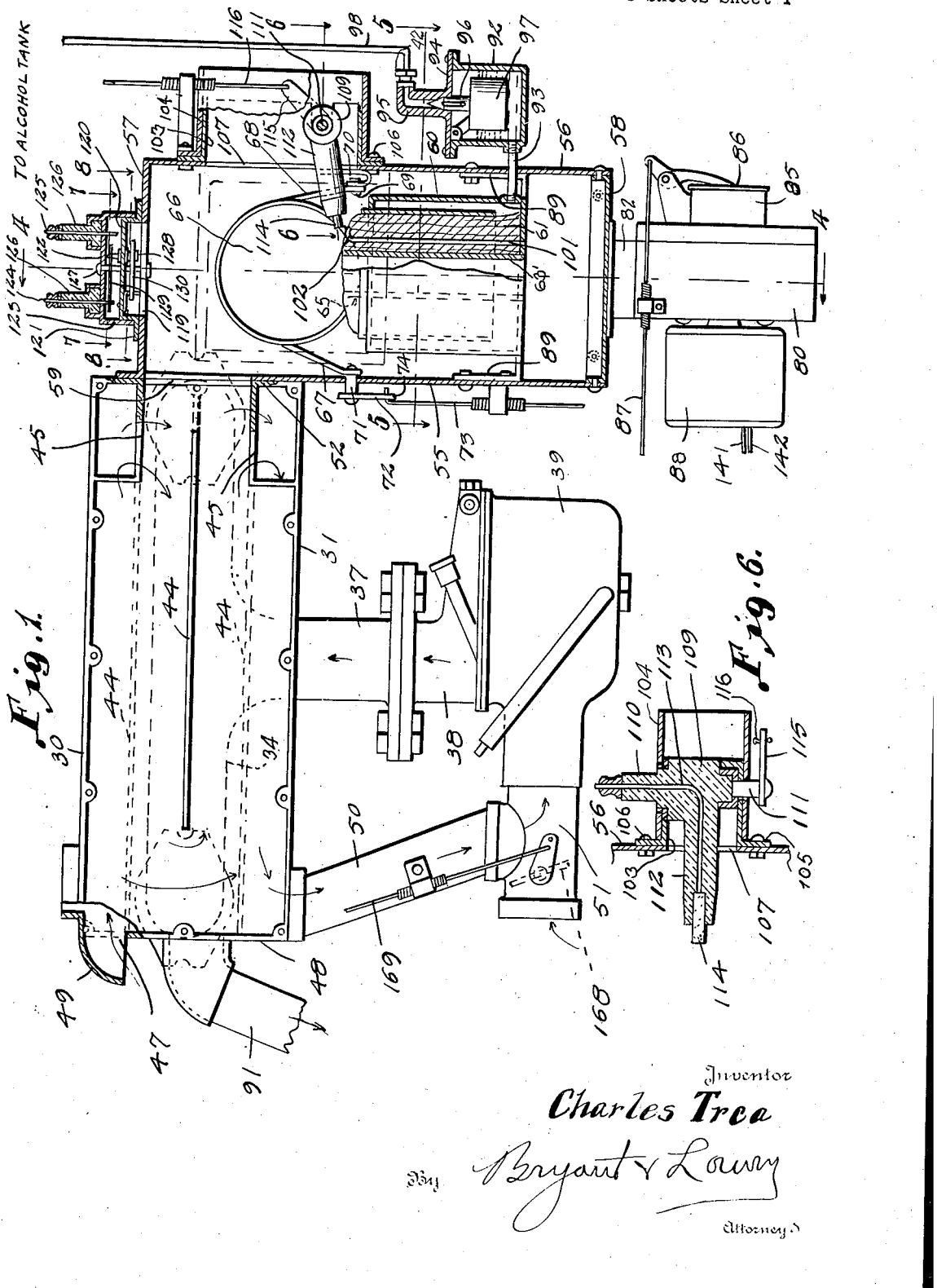
Figure 1 is a vertical side elevational view, partly broken away and shown in section of the heater for starting cold internal combustion engines, showing an alcohol burner associated with the heater, the heater being disposed above the up-draft carbureter and having a down-draft pipe communicating with the air intake of the carbureter.
Figure 6 is a detail sectional view taken on line 6—6 of Figure 1, showing the pivotal mounting of the wick igniting carbon electrode for the burner.

Figure 10 fragmentarily illustrates in side elevation, the two parts of the housing supporting the pivotally mounted wick igniting carbon electrode;

Figure 11 is a fragmentary sectional view of the dash board and instrument board of a motor vehicle equipped with the heater, showing an alcohol tank and coil supported on the dash board and control devices and signals for the heater supported on the instrument board;

Figure 12 is a fragmentary elevational view of the instrument board;

Figure 13 diagrammatically illustrates a wiring arrangement of electrical devices associated with the heater, the instrument being shown in section with control and signal devices supported thereon;

Figure 14 is a vertical cross-sectional view of the air heater, similar to Figure 3, but associated with a down-draft carbureter;

Figure 15 is a fragmentary top plan view, partly broken away and shown in section of another form of air heater constructed independently of the intake manifold, but attached thereto;

Figure 16 is a vertical cross-sectional view taken on line 16—16 of Figure 15, showing a chimney outlet carried by the air heater casing for the products of combustion of the air heater flowing through the casing;

Figure 17 is a fragmentary side elevational view, partly broken away and shown in section of another form of heater and associated burner, the latter being of the gasolene blow torch type;

Figure 18 is a vertical detail cross sectional view taken on line 18—18 of Figure 17;

Figure 19 is a detail sectional view of the burner nozzle shown in Figures 17 and 18;

Figure 20 is a detail cross-sectional view taken on line 20—20 of Figure 17;

Figure 21 is a horizontal longitudinal sectional view of another form of heater casing housing an electric resistance element and attached to an intake manifold fragmentarily illustrated in plan view;

Figure 22 is a vertical longitudinal sectional view taken on line 22—22 of Figure 21;

Figure 23 is a vertical cross-sectional view taken on line 23—23 of Figure 22;

Figure 24 is a vertical detail sectional view taken on line 24—24 of Figure 22;

Figure 25 is a vertical cross-sectional view of an air heater casing having an insulation covering;

Figure 26 is a fragmentary vertical longitudinal sectional view taken on line 26—26 of Figure 25;

Figure 27 is a fragmentary vertical sectional view of another form of alcohol burner and housing;

Figure 28 is a cross-sectional view taken on line 28—28 of Figure 27; and

Figure 29 is a detail sectional view taken on line 29—29 of Figure 27.

In the preferred form of the invention as illustrated in Figures 1 to 3, the air heater is cast in one piece with the intake manifold of the internal combustion engine and as shown in said figures, the air heater comprises a casing of elongated construction and substantially rectangular having top and bottom walls 30 and 31, an inner side wall 32 and a removable outer side wall 33, the latter being removed as illustrated in Figure 1 to show a part of the interior construction of the air heater casing. The intake manifold 34 of the internal combustion engine 35 is cast integral with the inner wall 32 and bottom wall 31 of the air heater casing, the intake manifold 34 having end legs 36 extending outwardly of the heater casing for attachment to the engine 35 and a depending pipe section 37 extending downwardly through the bottom wall 31 of the heater casing for attachment to the upper end of the pipe 38 rising from the carbureter 39. A partition in the heater casing comprising upper and lower walls 40 and 41 extending from the inner wall 32 of the heater casing respectively above and below the intake manifold 34 and parallel with and spaced from the top and bottom walls of the heater casing together with a vertical wall 42 connecting the forward ends of the walls 40 and 41 and spaced from the removable outer wall 33 of the heater casing provides a chamber 43 in the heater casing for the passage of products of combustion from the heater associated therewith and in which chamber the intake manifold 34 is located. The space between the partition walls 40 to 42 and the top and bottom and outer side walls of the heater casing is divided into circuitous passages by means of walls 44 having openings 45 therein, said passages being designated by the reference character 46. The air to be heated enters the heater casing as indicated by the arrow lines in Figure 1 through the end opening 47 in the end wall 48 of the casing, said entrance opening 47 having an overlying hood 49 associated therewith, the air travelling in a circuitous path through the air heater passages 46 and passing in a heated condition outwardly of the casing in a downward direction by means of the pipe 50 that is in communication with the air intake pipe 51 of the carbureter 39, gas produced by the mixture of heated air and gasolene flowing upwardly through the pipe 38 and lower pipe 37 of the intake manifold to said manifold 34 in the heat chamber 43 for additional heating and for final delivery through the pipe ends 36 into the internal combustion engine 35.

The heater for the air circuitously flowing through the passages 46 in the heater casing is attached to the end wall 52 of the heater casing, the heater comprising an elongated vertically disposed housing of substantially rectangular construction having side walls 53 and 54, end walls 55 and 56, a top wall 57 and a bottom wall 58 that is removably attached thereto. The upper end of the side wall 55 is secured to the end wall 52 of the air heater casing and said abutting walls have registering openings 59 therein to form communication between the heater housing and the air heater casing as will be readily understood from an inspection of Figure 1.

An alcohol burner is mounted in the heater housing below the opening 59 and, as shown in detail in Figures 1, 4, 5 and 9, the same comprises a head of receptacle formation having side wall construction 60, a bottom wall 61, an inwardly directed flange 62 at the upper ends of the side walls and a central vertical flue 63 extending upwardly from a central opening in the bottom wall 61 and terminating above the upper ends of the side walls 60. An annular wall 64 is set within the inwardly directed flange 62 and terminates in spaced relation to the bottom wall 61. A burner wick 65 is mounted in the space between the flue 63 and annular wall 64. A flame snuffer is associated with the upper end of the burner head and wick 65 and as shown more clearly in Figures 1 and 4, the flame snuffer comprises a flanged disk plate 66 carrying a pair of diametrically opposite arms 67 and 68, the arm 68 being pivotally mounted at its free end as at 69 to a bracket 70 attached to the side wall 56 of the heater housing. The free end of the other arm 67 is rigidly connected to a stub shaft 71 journaled in the side wall 55 of the heater housing in alinement with the pivot 69, the outer end of the stub shaft 71 having one end of an arm 72 rigidly attached thereto while a push and pull wire 73 that is attached at one end as at 74 has the other end thereof extending to the instrument board 75 carried by the dash board 76 of the motor vehicle and operated by one of the pull buttons 77 shown in Figure 12. Upon operation of the pull wire 73, the flame snuffer 66 is moved from the open positions shown in Figures 1 and 4 to its closed or flame snuffing position shown by dotted lines in Figure 4. As shown in Figure 9, a wick cleaner rod or pin 78 is carried in the flange 62 of the wall construction of the burner head.

To promote combustion of the alcohol burner wick 65 and for forcing heated products of combustion from the burner to the air heater casing and in particular, the chamber 43 therein, there is provided as shown in Figures 1 and 4, a fan blower associated with the bottom wall 58 of the heater housing. The fan blower casing 80 housing the fan wheel 81 has a tangential outlet pipe 82 having its free end attached as at 83 to the bottom wall 58 of the heater housing and in surrounding relation to the opening 84 in said bottom wall. An air inlet pipe 85 shown in Figure 1, axially communicates with the fan casing 80 and the inlet end of said air pipe 85 is normally closed by a hinged damper 86 operated by a pull wire 87 that extends to one of the pull buttons 77 on the instrument board 75. A motor 88 is attached to the fan casing 80 and operates the fan wheel 81, the control devices for the motor to be presently described. When the damper 86 is opened by the pull wire 87 and the motor 88 operating, the fan wheel 81 draws air into the fan casing through the air inlet pipe 85 and directs the same upwardly to the tangential outlet 82 of the fan casing into the lower end of the heater housing to be directed upwardly through the center flue 63 and around the wall construction 60 of the burner, the latter being supported in the heater housing by means of the brackets 89. The air draft causes the heated products of combination from the burner wick 65 to pass through the openings 59 in the heater housing and air heater casing for passage through the chamber 43 in the air heater casing for the heating of the air traveling in a circuitous path through the passages 46, the products of combustion exhausting through the opening 90 in the end wall 48 of the air heater casing and entering the discharge pipe 91 that is directed rearwardly of the automobile in proximity of the chassis thereof.

Alcohol supply means for the burner is shown more clearly in Figures 1 and 11, a float chamber 92 being suitably supported upon the wall 56 of the heater housing and having a pipe connection 93 with the alcohol chamber of the burner head afforded by the wall construction 60, bottom wall 61 and flue 63. The alcohol chamber 92 carries a cover 94 with an elbow fitting 95 integral therewith, the lower end of the opening in the elbow fitting 95 constituting a valve seat to be engaged by a valve 96 carried by the float 97 in the chamber 92. The upper end of the elbow fitting 95 has a pipe line connection 98 with an alcohol tank 99 mounted upon the dash board 76 of the vehicle, the tank 99 having a filling opening enclosed by a screw cap 100. The alcohol float chamber 92 is operated to maintain a constant alcohol level in the burner head.

An electrical spark device is provided for igniting the burner wick 65 and said sparking device and parts directly associated therewith are shown more clearly in Figures 1, 6 and 10. The wire 101 is embedded in the burner wick 65 with the lower end engaged with or grounded to the bottom wall 61 of the burner head, the upper end 102 of the wire 101 terminating at the upper end of the wick 65. A rectangular hood formed of two telescoping sections 103 and 104 shown in detail in Figure 10 have corresponding edges thereof flanged as at 105 for abutting engagement when the sections 103 and 104 are nested with said flanges secured as at 106 to the outer face of the wall 56 of the heater housing in registry with the opening 107 in said wall of the heater housing as shown in Figure 1, the outer end of the hood being open as illustrated. The meeting edges of the two sections 103 and 104 of the hood have edge opening slots 108 that co-operate when the hood sections are assembled to provide a bearing for a carbon electrode holder as shown in Figures 1 and 6. The carbon electrode holder includes an insulation block 109 having end portions 110 and 111 journaled in the openings 108 and a laterally directed arm 112 adapted to be projected through the opening 107 in the wall of the heater housing for positioning the inner end of the arm in proximity of the upper end 102 of the wire 101. A conductor wire 113 extends through the insulation block 109, one end 110 thereof and the arm 112 for engaging with the carbon electrode 114 at the free end of the arm 112. To move the carbon electrode 114 toward and away from the end 102 of the conductor wire 101, the end bearing 111 of the insulation block 109 projects outwardly of the hood and has one end of an arm 115 anchored thereto, the other end of the arm being connected to the pull wire 116 that extends to one of the pull buttons 77 on the instrument board 75. Signal devices are provided to indicate relatively low and high temperature conditions in the chamber 43 of the air heater casing so that it may be determined when air circulated through the passages 46 in the air heater casing will attain a proper high degree of heat for the starting of a cold internal combustion engine, the signaling devices including green and red signal lamps 117 and 118 respectively carried by the instrument board 75 as shown in Figures 12 and 13 and the switch devices for controlling the illumination of the lamps are shown more clearly in Figures 1, 7 and 8. The switch devices are associated with the top wall 57 of the heater housing, said top wall 57 having an opening 119 therein that is covered by an upstanding disk plate 120 mounted on the cover 57 by means of a depending annular flange 121. A disk plate 122 is mounted above the disk plate 120 and is spaced therefrom by the annular depending flange 123 engaged with the flange 121. The switch devices are further shown in Figures 1, 7 and 8 as including a pair of terminals 124 and 125 extending to insulation blocks 126 rising from the upper disk plate 122, the lower ends of the terminals extending into the space between the disk plates 120 and 122. The pin 127 retains the disk plates 120 and 122 in assembled relation on the top wall 57 of the heater housing. A pin 128 is journaled in the disk plate 120 slightly offset from the axis thereof, the upper end of the pin that extends into the space between the disk plates 120 and 122 carrying a switch arm 129 that is adapted to contact the terminals 124 and 125, as will be readily understood from an inspection of Figure 7. As shown in Figure 8, a heat expansive coil spring 130 has its inner end secured to the pin 128 below the disk plate 120 and the free end of said coiled spring 128 is engaged with an abutment 131 depending from the disk plate 120. In response to temperature conditions within the upper end of the heater housing and the combustion chamber 43 in the air heater casing, the coiled spring 130 is expanded and contracted for rotating the pin 128 to cause the switch arm 129 to be selectively engaged with the terminals 124 or 125 for the illumination of the lamps 117 and 118.

The electrical devices for effecting operation of the sparking electrode 114, the operation of the motor 88 for the fan blower 81 and for the illumination of the signal lamps 117 and 118 is shown in Figure 13. The storage battery 132 has the conductor 133 from one terminal grounded at 134. The conductor 135 from the other terminal of the battery 132 extends to the switch device 136 controlled by the button 137. From the terminal 138 of the switch device 136 a conductor wire 139 extends to the switch device 140 on the instrument board 75, the other wire 141 from the switch device 140 extending to the motor 88 for the fan blower while the other conductor wire 142 from the fan blower is grounded at 143. The speed of rotation of the motor 88 is controlled by the turn-button 144 on the instrument board and in a known manner. For the operation of the green signal lamp 117, the conductor wire 144 from the terminal 138 of the switch device 136 extends to the terminal 145 of the socket for the green lamp 117 while the conductor wire 146 from the other terminal 147 of the socket for the green lamp extends to the terminal 124 and when the switch arm 129 is engaged with the terminal 124, the conductor wire 148 extending from the pin 128 carrying the switch arm 129 to ground 149, the circuit is completed for the illumination of the green lamp 117. For the illumination of the red lamp 118, the conductor wire 150 extending from the terminal 138 of the switch device 136 is connected to the terminal 151 of the socket carrying the red lamp 118 while the other terminal 152 of said socket has the conductor wire 153 connected thereto that extends to the terminal 125 that is adapted to be engaged by the switch arm 129, that is shifted upon expansion of the heat responsive coiled spring 130 at the upper end of the heater housing. For the operation of the spark device for igniting the burner wick 65, a conductor wire 154 extends from the terminal 138 of the switch device 136 to the terminal 155 of the coil 156 supported upon the dash board 76 of the motor vehicle as shown in Figure 11, the second terminal 157 of the coil 156 having a conductor wire 158 extending to the carbon electrode 114 that cooperates with the adjacent end 102 of the sparking wire 101 from which the conductor wire 159 extends to ground 160. The third terminal 161 of the coil 156 has a conductor wire 162 extending to the terminal 163 of a push button switch 164, the other terminal 165 of the push button switch having a conductor wire 166 extending to ground 167. When the button 137 of the switch device 136 is moved to its operative position, the several electrical devices are rendered operable upon operation of the control switches therefor.

From the above detailed description of the form of invention illustrated in Figures 1 to 13, it is believed that the construction and operation thereof will at once be apparent, it being noted that the apparatus is especially designed as a heater for starting cold internal combustion engines and especially for the supply of heated air to the carburetor as well as for heating the intake manifold. Upon opening the switch device 36 by means of the button 37 as shown in Figure 13 and thereafter operating the push button 164, the sparking electrode 114 coacts with the wire 102 to produce a spark for the ignition of the burner wick 65 of the alcohol burner. The button or knob 44 may then be rotated to energize and operate the motor 38 for the operation of the fan wheel 81, the damper 86 opened by means of the pull wire 87 to admit air to the fan casing 80 to be blown upwardly through the heater housing and into and through the combustion chamber 43 in the air heater casing. After the burner wick has been ignited, the pull wire 116 is operated for laterally displacing the carbon electrode 114 into the hood at one side of the heater housing. The green lamp 117 is illuminated during low temperature conditions in the heater housing by the normal position of the coiled spring 130 holding the switch arm 129 engaged with the terminal 124. When the temperature in the upper end of the heater housing and in the chamber 43 in the air heater casing have been raised to the desired degree whereby air to be flowed through the circuitous passages 46 in the air heater casing will be heated to the proper degree, the heat responsive coiled spring 130 reacts or expands to rotate the pin 128 and move the switch arm 129 out of contact with the terminal 124 to extinguish the green lamp 117 and to move such switch arm 129 into engagement with the terminal 125 for the illumination of the red signal lamp 118, which will indicate to the operator that the heater has been raised to the desired temperature for the proper heating of the air to be fed to the carburetor. The valve 168 in the normal air intake pipe 51 of the carburetor 39 is closed by the pull wire 169 that extends to and is operated by one of the push buttons 77 upon the instrument board 75 so that only heated air flowing through the air heated casing is delivered through the pipe 50 into the carburetor 39, the products of combustion from the alcohol burner flowing through the chamber 43 of the air heater casing and escaping through the outlet pipe 91. After the engine has been started, the flame of the burner wick 65 is extinguished by operating the pull wire 73 by one of the buttons 77 for moving the disk 66 on its pivotal mountings 69 and 71 into the dotted line position shown in Figure 4 to overlie the upper end of the burner wick and to snuff the same. After the internal combustion engine has been successfully started, the switch device 136 is cut out by the push button 137, the valve device 168 in the air intake 51 of the carburetor opened for the normal operation of the carburetor and to the exclusion of the air heater device.

In the form of invention described, the air heater casing is associated with a carbureter of the up-draft type, while in Figure 14 of the drawings, the same type of air heater casing is associated with a carbureter of the down-draft type. As illustrated in Figure 14, the air heater casing has an air inlet pipe 48 associated therewith and the heated air after passage through the circuitous passages 46 in the air heater casing outlets through the top wall 30 into the conduit or pipe 50a for delivery to the down-draft air pipe 51a of the carbureter 39a, the down-draft pipe 51a being provided with a manually controlled damper 168a for shutting off the normal supply of air to the carbureter 39a. The gas mixture from the carbureter 39a flows downwardly through the pipe section 37a to enter the intake manifold 34 within the combustion chamber 43 of the air heater casing and for final discharge through the manifold pipe ends 36 into the internal combustion engine 35.

In the form of air heater device shown in Figures 15 to 20, the air heater casing designated in general by the reference character 30a is constructed independently of the intake manifold 34 and is attached thereto and to parts of the engine body by means of mounting brackets 170, as illustrated in Figure 15. The interior construction of the air heater casing 30a as shown in Figure 16 is similar to the heater casing shown in Figure 3 and has the internal partition construction comprising the walls 40, 41 and 42 to provide circuitous passages 46, the air heater casing 30a having an air inlet 47b and an exhaust pipe 91 in communication with the heater chamber 43 through which the products of combustion pass. The heater chamber 43 also as a chimney outlet 171 that is normally closed by a top damper plate 172.

A heater housing 173 is attached to one end of the air heater casing 30a and encloses a gasolene blow torch burner and fuel supply means therefor, the heater housing 173 being in communication with the combustion chamber that extends to one of the pull buttons 77 on the instrument board 75. A motor 88 is attached to the fan casing 80 and operates the fan wheel 81, the control devices for the motor to be presently described. When the damper 86 is opened by the pull wire 87 and the motor 88 operating, the fan wheel 81 draws air into the fan casing through the air inlet pipe 85 and directs the same upwardly to the tangential outlet 82 of the fan casing into the lower end of the heater housing to be directed upwardly through the center flue 63 and around the wall construction 60 of the burner, the latter being supported in the heater housing by means of the brackets 89. The air draft causes the heated products of combustion from the burner wick 65 to pass through the openings 59 in the heater housing and air heater casing for passage through the chamber 43 in the air heater casing for the heating of the air traveling in a circuitous path through the passages 46, the products of combustion exhausting through the opening 90 in the end wall 48 of the air heater casing and entering the discharge pipe 91 that is directed rearwardly of the automobile in proximity of the chassis thereof.

Alcohol supply means for the burner is shown more clearly in Figures 1 and 11, a float chamber 92 being suitably supported upon the wall 56 of the heater housing and having a pipe connection 93 with the alcohol chamber of the burner head afforded by the wall construction 60, bottom wall 61 and flue 63. The alcohol chamber 92 carries a cover 94 with an elbow fitting 95 integral therewith, the lower end of the opening in the elbow fitting 95 constituting a valve seat to be engaged by a valve 96 carried by the float 97 in the chamber 92. The upper end of the elbow fitting 95 has a pipe line connection 98 with an alcohol tank 99 mounted upon the dash board 76 of the vehicle, the tank 99 having a filling opening enclosed by a screw cap 100. The alcohol float chamber 92 is operated to maintain a constant alcohol level in the burner head.

An electrical spark device is provided for igniting the burner wick 65 and said sparking device and parts directly associated therewith are shown more clearly in Figures 1, 6 and 10. The wire 101 is embedded in the burner wick 65 with the lower end engaged with or grounded to the bottom wall 61 of the burner head, the upper end 102 of the wire 101 terminating at the upper end of the wick 65. A rectangular hood formed of two telescoping sections 103 and 104 shown in detail in Figure 10 have corresponding edges thereof flanged as at 105 for abutting engagement when the sections 103 and 104 are nested with said flanges secured as at 106 to the outer face of the wall 56 of the heater housing in registry with the opening 107 in said wall of the heater housing as shown in Figure 1, the outer end of the hood being open as illustrated. The meeting edges of the two sections 103 and 104 of the hood have edge opening slots 108 that co-operate when the hood sections are assembled to provide a bearing for a carbon electrode holder as shown in Figures 1 and 6. The carbon electrode holder includes an insulation block 109 having end portions 110 and 111 journaled in the openings 108 and a laterally directed arm 112 adapted to be projected through the opening 107 in the wall of the heater housing for positioning the inner end of the arm in proximity of the upper end 102 of the wire 101. A conductor wire 113 extends through the insulation block 109, one end 110 thereof and the arm 112 for engaging with the carbon electrode 114 at the free end of the arm 112. To move the carbon electrode 114 toward and away from the end 102 of the conductor wire 101, the end bearing 111 of the insulation block 109 projects outwardly of the hood and has one end of an arm 115 anchored thereto, the other end of the arm being connected to the pull wire 116 that extends to one of the pull buttons 77 on the instrument board 75. Signal devices are provided to indicate relatively low and high temperature conditions in the chamber 43 of the air heater casing so that it may be determined when air circulated through the passages 46 in the air heater casing will attain a proper high degree of heat for the starting of a cold internal combustion engine, the signaling devices including green and red signal lamps 117 and 118 respectively carried by the instrument board 75 as shown in Figures 12 and 13 and the switch devices for controlling the illumination of the lamps are shown more clearly in Figures 1, 7 and 8. The switch devices are associated with the top wall 57 of the heater housing, said top wall 57 having an opening 119 therein that is covered by an upstanding disk plate 120 mounted on the cover 57 by means of a depending annular flange 121. A disk plate 122 is mounted above the disk plate 120 and is spaced therefrom by the annular depending flange 123 engaged with the flange 121. The switch devices are further shown in Figures 1, 7 and 8 as including a pair of terminals 124 and 125 extending to insulation blocks 126 rising from the upper disk plate 122, the lower ends of the terminals extending into the space between the disk plates 120 and 122. The pin 127 retains the disk plates 120 and 122 in assembled relation on the top wall 57 of the heater housing. A pin 128 is journaled in the disk plate 120 slightly offset from the axis thereof, the upper end of the pin that extends into the space between the disk plates 120 and 122 carrying a switch arm 129 that is adapted to contact the terminals 124 and 125, as will be readily understood from an inspection of Figure 7. As shown in Figure 8, a heat expansive coil spring 130 has its inner end secured to the pin 128 below the disk plate 120 and the free end of said coiled spring 128 is engaged with an abutment 131 depending from the disk plate 120. In response to temperature conditions within the upper end of the heater housing and the combustion chamber 43 in the air heater casing, the coiled spring 130 is expanded and contracted for rotating the pin 128 to cause the switch arm 129 to be selectively engaged with the terminals 124 or 125 for the illumination of the lamps 117 and 118.

The electrical devices for effecting operation of the sparking electrode 114, the operation of the motor 88 for the fan blower 81 and for the illumination of the signal lamps 117 and 118 is shown in Figure 13. The storage battery 132 has the conductor 133 from one terminal grounded at 134. The conductor 135 from the other terminal of the battery 132 extends to the switch device 136 controlled by the button 137. From the terminal 138 of the switch device 136 a conductor wire 139 extends to the switch device 140 on the instrument board 75, the other wire 141 from the switch device 140 extending to the motor 88 for the fan blower while the other conductor wire 142 from the fan blower is grounded at 143. The speed of rotation of the motor 88 is controlled by the turn-button 144 on the instrument board and in a known manner. For the operation of the green signal lamp 117, the conductor wire 144 from the terminal 138 of the switch device 136 extends to the terminal 145 of the socket for the green lamp 117 while the conductor wire 146 from the other terminal 147 of the socket for the green lamp extends to the terminal 124 and when the switch arm 129 is engaged with the terminal 124, the conductor wire 148 extending from the pin 128 carrying the switch arm 129 to ground 149, the circuit is completed for the illumination of the green lamp 117. For the illumination of the red lamp 118, the conductor wire 150 extending from the terminal 138 of the switch device 136 is connected to the terminal 151 of the socket carrying the red lamp 118 while the other terminal 152 of said socket has the conductor wire 153 connected thereto that extends to the terminal 125 that is adapted to be engaged by the switch arm 129, that is shifted upon expansion of the heat responsive coiled spring 130 at the upper end of the heater housing. For the operation of the spark device for igniting the burner wick 65, a conductor wire 154 extends from the terminal 138 of the switch device 136 to the terminal 155 of the coil 156 supported upon the dash board 76 of the motor vehicle as shown in Figure 11, the second terminal 157 of the coil 156 having a conductor wire 158 extending to the carbon electrode 114 that cooperates with the adjacent end 102 of the sparking wire 101 from which the conductor wire 159 extends to ground 160. The third terminal 161 of the coil 156 has a conductor wire 162 extending to the terminal 163 of a push button switch 164, the other terminal 165 of the push button switch having a conductor wire 166 extending to ground 167. When the button 137 of the switch device 136 is moved to its operative position, the several electrical devices are rendered operable upon operation of the control switches therefor.

From the above detailed description of the form of invention illustrated in Figures 1 to 13, it is believed that the construction and operation thereof will at once be apparent, it being noted that the apparatus is especially designed as a heater for starting cold internal combustion engines and especially for the supply of heated air to the carburetor as well as for heating the intake manifold. Upon opening the switch device 36 by means of the button 37 as shown in Figure 13 and thereafter operating the push button 164, the sparking electrode 114 coacts with the wire 102 to produce a spark for the ignition of the burner wick 65 of the alcohol burner. The button or knob 44 may then be rotated to energize and operate the motor 38 for the operation of the fan wheel 81, the damper 86 opened by means of the pull wire 87 to admit air to the fan casing 80 to be blown upwardly through the heater housing and into and through the combustion chamber 43 in the air heater casing. After the burner wick has been ignited, the pull wire 116 is operated for laterally displacing the carbon electrode 114 into the hood at one side of the heater housing. The green lamp 117 is illuminated during low temperature conditions in the heater housing by the normal position of the coiled spring 130 holding the switch arm 129 engaged with the terminal 124. When the temperature in the upper end of the heater housing and in the chamber 43 in the air heater casing have been raised to the desired degree whereby air to be flowed through the circuitous passages 46 in the air heater casing will be heated to the proper degree, the heat responsive coiled spring 130 reacts or expands to rotate the pin 128 and move the switch arm 129 out of contact with the terminal 124 to extinguish the green lamp 117 and to move such switch arm 129 into engagement with the terminal 125 for the illumination of the red signal lamp 118, which will indicate to the operator that the heater has been raised to the desired temperature for the proper heating of the air to be fed to the carburetor. The valve 168 in the normal air intake pipe 51 of the carburetor 39 is closed by the pull wire 169 that extends to and is operated by one of the push buttons 77 upon the instrument board 75 so that only heated air flowing through the air heated casing is delivered through the pipe 50 into the carburetor 39, the products of combustion from the alcohol burner flowing through the chamber 43 of the air heater casing and escaping through the outlet pipe 91. After the engine has been started, the flame of the burner wick 65 is extinguished by operating the pull wire 73 by one of the buttons 77 for moving the disk 66 on its pivotal mountings 69 and 71 into the dotted line position shown in Figure 4 to overlie the upper end of the burner wick and to snuff the same. After the internal combustion engine has been successfully started, the switch device 136 is cut out by the push button 137, the valve device 168 in the air intake 51 of the carburetor opened for the normal operation of the carburetor and to the exclusion of the air heater device.

In the form of invention described, the air heater casing is associated with a carbureter of the up-draft type, while in Figure 14 of the drawings, the same type of air heater casing is associated with a carbureter of the down-draft type. As illustrated in Figure 14, the air heater casing has an air inlet pipe 48 associated therewith and the heated air after passage through the circuitous passages 46 in the air heater casing outlets through the top wall 30 into the conduit or pipe 50a for delivery to the down-draft air pipe 51a of the carbureter 39a, the down-draft pipe 51a being provided with a manually controlled damper 168a for shutting off the normal supply of air to the carbureter 39a. The gas mixture from the carbureter 39a flows downwardly through the pipe section 37a to enter the intake manifold 34 within the combustion chamber 43 of the air heater casing and for final discharge through the manifold pipe ends 36 into the internal combustion engine 35.

In the form of air heater device shown in Figures 15 to 20, the air heater casing designated in general by the reference character 30a is constructed independently of the intake manifold 34 and is attached thereto and to parts of the engine body by means of mounting brackets 170, as illustrated in Figure 15. The interior construction of the air heater casing 30a as shown in Figure 16 is similar to the heater casing shown in Figure 3 and has the internal partition construction comprising the walls 40, 41 and 42 to provide circuitous passages 46, the air heater casing 30a having an air inlet 47b and an exhaust pipe 91 in communication with the heater chamber 43 through which the products of combustion pass. The heater chamber 43 also as a chimney outlet 171 that is normally closed by a top damper plate 172.

A heater housing 173 is attached to one end of the air heater casing 30a and encloses a gasolene blow torch burner and fuel supply means therefor, the heater housing 173 being in communication with the combustion chamber 43 of the air heater casing as shown in Figure 17. A gasolene tank 174 is supported by means of brackets 175 within the lower end of the heater housing 173 and includes a filler opening closed by a screw plug 176, and a hand pump 177 for placing the fuel under pressure for delivery to a blow torch. A pipe 178 having a wick 178a therein is mounted in the top wall of the gasolene tank 174 supports at its upper end above said gasolene tank, a burner nozzle 179 controlled in its operation by a needle valve construction 180, the burner 179 being of the retort type and having a fuel collection pan 181 supported on the upper end of the pipe 179 below said burner. A pair of flame directing guide plates 182 is mounted in the housing, respectively at opposite sides of the burner 179 and are supported in position by means of brackets 183 connected to the side walls of the heater housing 173 as shown in Figure 18, the flame guide plates 182 directing the flame from the burner 179 into the combustion chamber 43 of the air heater casing 30a. The burner 179 is controlled in its operation by means of its needle valve construction 180 that includes a knurled head 184 disposed at the outer side of the heater housing 173 as shown in Figures 17 and 20 with the needle valve shaft journalled in a graduated disk plate 185 that overlies an opening in the side wall of the heater housing 173. An air inlet pipe 186 is attached to the bottom wall of the heater housing 173 and has a control damper 187 therein, while a damper controlled outlet 187a is carried by the top wall.

In the form of invention illustrated in Figures 21 to 24, an electric resistance element is employed for the heating of air which is to be fed to the carbureter, the air heater casing 30b being attached to the intake manifold 34 by means of brackets 170a and said air heater casing 30b has an air inlet opening 188 at one end thereof and upper and lower heated air outlet opening 189 and 190 respectively at the opposite ends to accommodate the heater casing 30b for carbureters of either the up-draft or down-draft type, the unemployed outlet opening 189 or 190 having closure means associated therewith. Insulation blocks 191 and 192 supported within the air heater casing 30b adjacent opposite ends support an electrical resistance element 193, the insulation block 192 carrying exposed terminals 194 for attachment to a connector of a source of electrical energy. Air enters the air heater casing 30b to the air inlet opening 188 and is heated by passing over the resistance elements 193 for discharge through either air outlet 189 or 190 to the associated carbureter.

Another form of alcohol burner combined with a heater housing that is associated with the air heater casing is shown in Figures 27 to 29, the heater housing 55a being attached to one end of the heater casing 30a and in communication therewith by way of the opening 59a. The heater housing 55a incloses the alcohol burner 60a which includes a cylindrical wall 64a concentric with and spaced inwardly of the burner 60a with a wick 65a supported by the wall 64a. The burner 60a extends an appreciable distance above the wick supporting wall 64a and to facilitate combustion, the upper end of the burner wall 60a has a plurality of circumferentially spaced inwardly and downwardly struck fingers 200, while an annular frusto-conical flange 201 carried by the inner face of the heater housing 55a in proximity of said inwardly struck fingers 200 cause air to enter the upper end of the burner and be directed downwardly onto the upper end of the wick 65a. Air for combustion purposes is further provided by means of a series of openings 202 in the upper end of the cylindrical wick holding member 64a. A flame snuffer 66a is associated with the upper end of the burner 60a and comprises a disk plate that is attached at an edge thereof as at 203 to the shaft 71a journaled transversely of the heater housing 55a, the shaft 71a projecting laterally of the heater housing and having an operating lever 72a attached thereto. The upper end of the heater housing above the burner 60a is provided with an arcuate flame and heat deflecting wall 204 for directing heat and products of combustion into the air heater casing 30a as will at once be understood from an inspection of Figure 27.

The spark ignition means for the wick 65a includes a wire 101a grounded to the cylindrical wall 64a with its upper end 102a terminating adjacent the upper end of the wick 65. An arcuate cooperating sparking rod 114a is pivotally mounted in the casing 103a that is supported on the heater housing 55a, the sparking rod 114a being mounted upon a shaft 110a that projects from the casing 103a as at 111a for the attachment of an operating lever 115a. The sparking finger 114a has its operative end movable through an opening 107a in the heater housing 55a and during such movement the same is contacted by a pair of cleaner brushes 205 as shown in Figures 27 and 28, the sparking finger 114a being movable as illustrated by dotted lines in Figure 27 into sparking position with respect to the upper end 102a of the sparking wire 101a. It will be understood that the sparking finger 114a and sparking wire 101a have suitable electrical connections to render them operable. As an aid to assure ignition of the wick 65a by the sparking device, a heat resistance element 206 is associated with the upper end of the wick 65a and is positioned between the operative sparking position of the sparking finger 114a and the upper end of the sparking wire 102a, the coiled resistance element 206 having a wire 207 grounded to the burner 60a and another wire 208 extending to the heater housing 55a as at 209 for communication with a source of electrical energy. The electrical resistance element 206 will tend to vaporize the alcohol at the upper end of the wick 65a to assure ignition of the wick when the sparking device is operated.

In all forms of the invention, the air heater casing as illustrated in Figures 25 and 26 is covered with asbestos or other heat insulation material 195 for the maximum radiation of heat into the circuitous air passages 46 by the partition wall construction bordering the combustion chamber 43 of the air heater casing.

From the above detailed description of the invention, it is believed that the construction and operation thereof will at once be apparent and while there are herein shown and described the preferred embodiments of the invention, it is nevertheless to be understood that minor changes may be made therein without departing from the spirit and scope of the invention as claimed.

I claim:

1. In a heater of the character described, an air heater casing having a combustion passage therethrough and circuitous air flow passages bordering the combustion passage, said casing when mounted in position having the intake manifold of an internal combustion engine located in the combustion passage, means forming communication between the air flow passages and the carburetor of the engine, a heater housing at one end of the casing in communication with the combustion passage, a fuel burner in the heater housing, controlled means for admitting air for combustion to the heater housing, and signal devices associated with the heater housing for indicating the temperature therein.

2. In a heater of the character described, an air heater casing having a combustion passage therethrough and circuitous air flow passages bordering the combustion passage, said casing when mounted in position having the intake manifold of an internal combustion engine located in the combustion passage, means forming communication between the air flow passages and the carburetor of the engine, a heater housing at one end of the casing in communication with the combustion passage, a fuel burner in the heater housing, controlled means for admitting air for combustion to the heater housing, and signal devices associated with the heater housing for indicating the temperature therein, including thermostatically operated electrical switch elements associated with the heater casing and low and high temperature indicating signal lamps adapted to be illuminated by said switch elements.

3. A heater of the character set forth in claim 1, characterized by the heater casing and intake manifold being of unitary construction.

4. A heater of the character set forth in claim 2, characterized by the heater casing and intake manifold being of unitary construction.

5. A heater of the character set forth in claim 1, characterized by the air admission means to the heater housing including a fan blower attached to the housing, a motor for operating the fan blower, a control switch for the motor and a manually controlled damper for admitting air to the fan blower.

6. A heater of the character set forth in claim 2, characterized by the air admission means to the heater housing including a fan blower attached to the housing, a motor for operating the fan blower, a control switch for the motor and a manually controlled damper for admitting air to the fan blower.

7. A heater of the character set forth in claim 1, characterized by the fuel burner including an alcohol lamp with a wick, an electrical terminal embedded in the wick and a sparking electrode associated with said terminal.

8. A heater of the character set forth in claim 2, characterized by the fuel burner including an alcohol lamp with a wick, an electrical terminal embedded in the wick and a sparking electrode associated with said terminal.

9. A heater of the character set forth in claim 1, characterized by the fuel burner including an alcohol lamp with a wick, an electrical terminal embedded in the wick and a sparking electrode associated with said terminal, said sparking electrode being pivotally mounted for movements toward and away from said wick and terminal and means for shifting said sparking electrode.

10. A heater of the character set forth in claim 2, characterized by the fuel burner including an alcohol lamp with a wick, an electrical terminal embedded in the wick and a sparking electrode associated with said terminal, said sparking electrode being pivotally mounted for movements toward and away from said wick and terminal and means for shifting said sparking electrode.

11. A heater of the character set forth in claim 1, characterized by the fuel burner including an alcohol lamp with a wick, an electrical terminal embedded in the wick and a sparking electrode associated with said terminal and an electrical resistance element in proximity of the upper end of the wick to facilitate ignition of the wick and located at the sparking gap between the embedded terminal and said electrode.

12. A heater of the character set forth in claim 2, characterized by the fuel burner including an alcohol lamp with a wick, an electrical terminal embedded in the wick and a sparking electrode associated with said terminal and an electrical resistance element in proximity of the upper end of the wick to facilitate ignition of the wick and located at the sparking gap between the embedded terminal and said electrode.

13. A heater of the character set forth in claim 1, characterized by the fuel burner including an alcohol lamp with a wick, an electrical terminal embedded in the wick and a sparking electrode associated with said terminal, said sparking electrode being pivotally mounted for movements toward and away from said wick and terminal, means for shifting said sparking electrode and an electrical resistance element in proximity of the upper end of the wick to facilitate ignition of the wick and located at the sparking gap between the embedded terminal and said electrode.

14. A heater of the character set forth in claim 2, characterized by the fuel burner including an alcohol lamp with a wick, an electrical terminal embedded in the wick and a sparking electrode associated with said terminal, said sparking electrode being pivotally mounted for movements toward and away from said wick and terminal, means for shifting said sparking electrode and an electrical resistance element in proximity of the upper end of the wick to facilitate ignition of the wick and located at the sparking gap between the embedded terminal and said electrode.

15. A heater of the character set forth in claim 1, characterized by a heat insulation covering for the air heater casing.

16. A heater of the character set forth in claim 2, characterized by a heat insulation covering for the air heater casing.

CHARLES TRCA.